United States Patent
Li

(10) Patent No.: US 10,614,795 B2
(45) Date of Patent: Apr. 7, 2020

(54) ACOUSTIC MODEL GENERATION METHOD AND DEVICE, AND SPEECH SYNTHESIS METHOD

(71) Applicant: BAIDU ONLINE NETWORK TECHNOLOGY (BEIJING) CO., LTD., Beijing (CN)

(72) Inventor: Xiulin Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 140 days.

(21) Appl. No.: 15/758,214

(22) PCT Filed: Jul. 14, 2016

(86) PCT No.: PCT/CN2016/090044
§ 371 (c)(1),
(2) Date: Mar. 7, 2018

(87) PCT Pub. No.: WO2017/067246
PCT Pub. Date: Apr. 27, 2017

(65) Prior Publication Data
US 2018/0211649 A1  Jul. 26, 2018

(30) Foreign Application Priority Data

Oct. 19, 2015 (CN) .......................... 2015 1 0680816

(51) Int. Cl.
*G10L 13/027* (2013.01)
*G10L 13/047* (2013.01)
(Continued)

(52) U.S. Cl.
CPC .......... *G10L 13/047* (2013.01); *G06F 40/169* (2020.01); *G10L 13/02* (2013.01); *G10L 13/08* (2013.01)

(58) Field of Classification Search
None
See application file for complete search history.

(56) References Cited

U.S. PATENT DOCUMENTS

| 10,410,621 B2* | 9/2019 | Li .......................... G10L 15/063 |
| 2005/0071163 A1* | 3/2005 | Aaron ..................... G10L 13/10 |
| | | 704/260 |

(Continued)

FOREIGN PATENT DOCUMENTS

| CN | 1379391 | 11/2002 |
| CN | 101308652 | 11/2008 |

(Continued)

OTHER PUBLICATIONS

WIPO, ISR for PCT/CN2016/090044, Oct. 14, 2016.
SIPO, Office Action for CN App. No. 201510680816.8, dated Aug. 25, 2016.

*Primary Examiner* — Abul K Azad
(74) *Attorney, Agent, or Firm* — Hodgson Russ LLP

(57) ABSTRACT

An acoustic model generation method and device, and a speech synthesis method and device. The acoustic model generation method comprises: acquiring personalized data, wherein the personalized data is obtained after processing according to personalized speech data and corresponding personalized text data (S11); acquiring a pre-generated reference acoustic model, wherein the reference acoustic model is generated according to existing large-scale samples (S12); and carrying out self-adaptive model training according to the personalized data and the reference acoustic model to generate a personalized acoustic model (S13). According to the method, an acoustic model can be rapidly generated, and personalized requirements of users can be satisfied.

11 Claims, 5 Drawing Sheets

(51) Int. Cl.
    *G10L 13/02*    (2013.01)
    *G06F 40/169*    (2020.01)
    *G10L 13/08*    (2013.01)

(56) References Cited

U.S. PATENT DOCUMENTS

| | | | | |
|---|---|---|---|---|
| 2010/0312563 | A1 | 12/2010 | Zhao et al. | |
| 2014/0039893 | A1* | 2/2014 | Weiner | G06F 3/167 704/249 |
| 2015/0019220 | A1* | 1/2015 | Talhami | G10L 15/063 704/244 |
| 2015/0025890 | A1* | 1/2015 | Jagatheesan | G10L 15/32 704/255 |

FOREIGN PATENT DOCUMENTS

| | | |
|---|---|---|
| CN | 102779508 | 11/2012 |
| CN | 105206258 | 12/2015 |
| CN | 105261355 | 1/2016 |

\* cited by examiner

ACOUSTIC MODEL GENERATION METHOD AND DEVICE, AND SPEECH SYNTHESIS METHOD

CROSS-REFERENCE TO RELATED APPLICATION

This application is a U.S. national phase application of International Patent Application No. PCT/CN2016/090044, filed Jul. 14, 2016, which claims priority to and benefits of Chinese Patent Application Serial No. 201510680816.8, filed with the State Intellectual Property Office of P. R. China on Oct. 19, 2015 by BAIDU ONLINE NETWORK TECHNOLOGY (BEIJING) CO., LTD., and titled with "ACOUSTIC MODEL GENERATION METHOD AND DEVICE, AND SPEECH SYNTHESIS METHOD AND DEVICE", the entire content of which is incorporated herein by reference.

FIELD

The present disclosure relates to a speech synthesis technology field, and more particularly to a method and a device for generating an acoustic model, and a method and a device for speech synthesis.

BACKGROUND

Speech synthesis, also known as text to speech technology, can transform any text information into a standard and fluent speech to be read out in real time, equivalent to installing an artificial mouth on the machine. In speech synthesis, firstly, it needs to process input text, including pre-processing, word segmentation, part-of-speech tagging, phonetic notation, prosodic hierarchy prediction, and the like, then to generate acoustic parameters via an acoustic model, and finally, to synthesize a voice via a vocoder using the acoustic parameters or select units from a recording corpus base for splicing.

In the related art, the generation process of the acoustic model takes a long time and cannot meet individual demands.

SUMMARY

Embodiments of the present disclosure seek to solve at least one of the problems existing in the related art to at least some extent.

Accordingly, an objective of the present disclosure is to provide a method for generating an acoustic model. The method can improve a speed of generating the acoustic model, and can meet individual demands of users.

Another objective of the present disclosure is to provide a device for generating an acoustic model.

Another objective of the present disclosure is to provide a method for speech synthesis.

Another objective of the present disclosure is to provide a device for speech synthesis.

To achieve the above objectives, embodiments of a first aspect of the present disclosure provide a method for generating an acoustic model, including: obtaining personalized data, in which the personalized data is obtained according to personalized speech data and personalized text data corresponding to the personalized speech data; obtaining a pre-generated reference acoustic model, in which the pre-generated reference acoustic model is generated according to large-scale samples; and performing an adaptive model training according to the personalized data and the pre-generated reference acoustic model to generate a personalized acoustic model.

To achieve the above objectives, embodiments of a second aspect of the present disclosure provide a device for generating an acoustic model, including: a first obtaining module, configured to obtain personalized data, in which the personalized data is obtained according to personalized speech data and personalized text data corresponding to the personalized speech data; a second obtaining module, configured to obtain a pre-generated reference acoustic model, in which the pre-generated reference acoustic model is generated according to large-scale samples; and a generating module, configured to perform an adaptive model training according to the personalized data and the pre-generated reference acoustic model to generate a personalized acoustic model.

To achieve the above objectives, embodiments of a third aspect of the present disclosure provide a method for speech synthesis, including: processing input text to obtain processed text; obtaining pre-generated personalized acoustic model; generating acoustic parameters according to the pre-generated personalized acoustic model and the processed text; and performing speech synthesis according to generated acoustic parameters to obtain personalized synthetic speech, in which the pre-generated personalized acoustic model is generated using the method according to embodiments of the first aspect of the present disclosure.

To achieve the above objectives, embodiments of a fourth aspect of the present disclosure provide a device for speech synthesis, including: a processing module, configured to process input text to obtain processed text; an obtaining module, configured to obtain a pre-generated personalized acoustic model; a generating module, configured to generate acoustic parameters according to the pre-generated personalized acoustic model and the processed text; and a synthesis module, configured to perform speech synthesis according to generated acoustic parameters to obtain personalized synthetic speech, in which the pre-generated personalized acoustic model is generated using the method according to embodiments of the first aspect of the present disclosure.

Embodiments of the present disclosure also provide an electronic apparatus, including: one or more processors; a memory; one or more programs stored in the memory, in which when the one or more programs are executed by the one or more processors, the method according to any one of embodiments of the first aspect of the present disclosure is performed.

Embodiments of the present disclosure also provide a non-transitory computer storage medium having one or more modules stored therein, in which when the one or more modules are executed, the method according to any one of embodiments of the first aspect of the present disclosure is performed.

Embodiments of the present disclosure also provide an electronic apparatus, including: one or more processors; a memory; one or more programs stored in the memory, in which when the one or more programs are executed by the one or more processors, the method according to any one of embodiments of the third aspect of the present disclosure is performed.

Embodiments of the present disclosure also provide a non-transitory computer storage medium having one or more modules stored therein, in which when the one or more modules are executed, the method according to any one of embodiments of the third aspect of the present disclosure is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
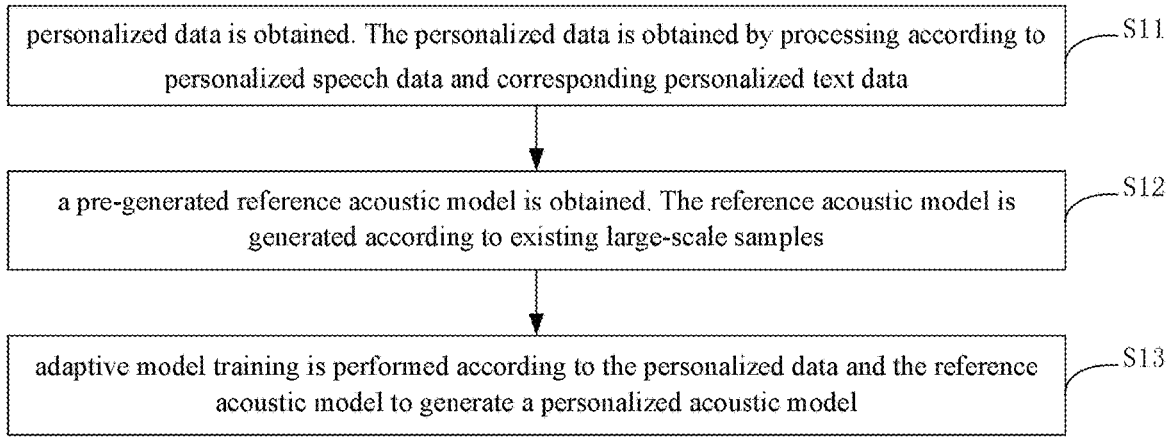
FIG. 1 is a flow chart of a method for generating an acoustic model according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. On the contrary, embodiments of the present disclosure include all the changes, alternatives, and modifications falling into the scope of the spirit and principles of the attached claims.

FIG. 1 is a flow chart of a method for generating an acoustic model according to an embodiment of the present disclosure. The method includes the followings.

In step S11, personalized data is obtained. The personalized data is obtained according to personalized speech data and corresponding personalized text data.

Figure 2:
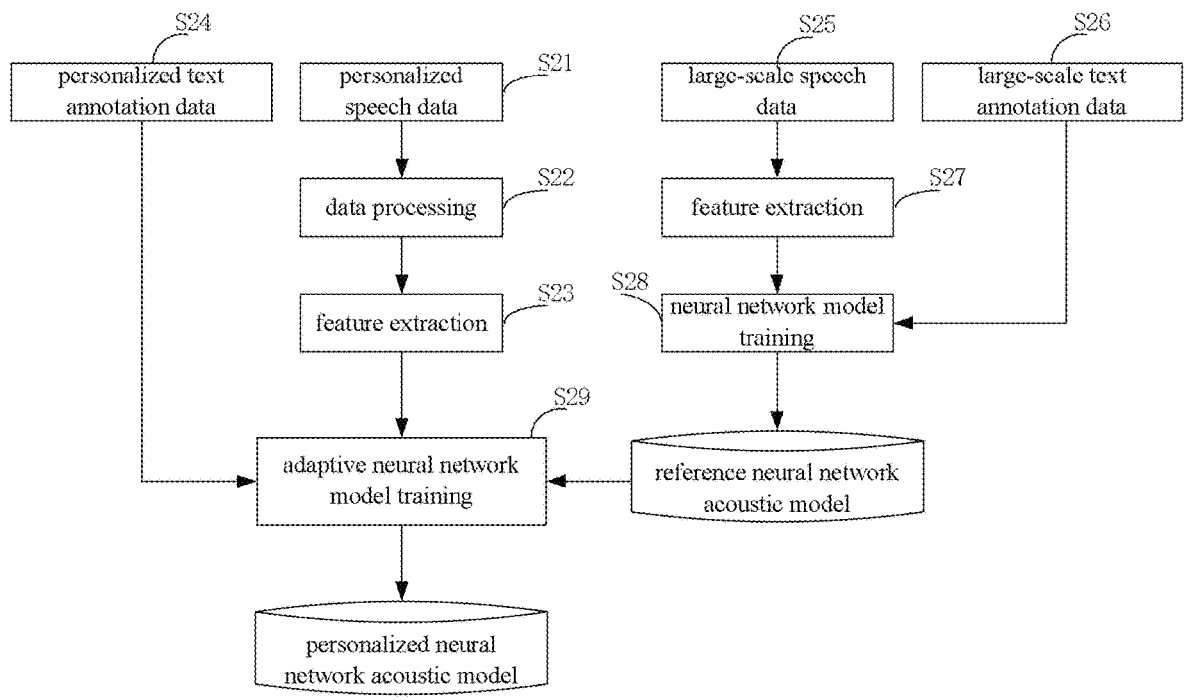
FIG. 2 is a flow chart of a method for generating an acoustic model according to another embodiment of the present disclosure.

For example, referring to FIG. 2, when the personalized data is obtained, it may include the followings.

In step S21, the personalized speech data is obtained.

The personalized speech data is speech data that can meet individual demands of users.

The personalized speech data can only include speech data of a target speaker, or can include the speech data of the target speaker and speech data of a similar speaker having a similar speech with the target speaker For example, the speech data of the target speaker includes speech data of a user himself, speech data of a family member or a friend of the user, speech data of a star, or the like.

The personalized speech data can be obtained by sample collection.

Compared with thousands of samples usually collected during training of an ordinary acoustic model, when the personalized speech data is just the speech data of the target speaker, a sample size of the speech data of the target speaker is in a range of several hundreds or several dozens; and when the personalized speech data also includes the speech data of the similar speaker, the sample size of the speech data of the target speaker can be further reduced, for example, collecting several sentences.

In step S22, data processing is performed on the personalized speech data.

For example, the data processing includes de-noising processing, segmentation processing, and the like. Specific de-noising rules and segmentation rules can be preset.

In step S23, a feature extraction is performed on personalized speech data after the data processing.

For example, extracted features include acoustic features such as a spectrum, a fundamental frequency, duration, and the like.

The personalized data is obtained according to the personalized speech data via steps S21 to S23.

In addition, the personalized data also includes personalized text annotation data. Correspondingly, referring to FIG. 2, the method further includes followings.

In step S24, the personalized text annotation data is obtained.

The personalized text annotation data is obtained by annotating personalized text corresponding to the personalized speech data. In detail, when the personalized speech data is collected, corresponding personalized text data is obtained at the same time. It is found whether there is annotation data corresponding to the personalized text data in an existing database. If yes, the annotation data corresponding to the personalized text data can be directly obtained from the existing database as the personalized text annotation data. If no, a way of manual annotation or automatic annotation can be used to obtain the personalized text annotation data. For example, the way of automatic annotation can be realized in combination with technologies such as speech recognition, automatic boundary segmentation, and the like.

For example, the text annotation data includes annotation to Chinese phoneticize, prosodic hierarchy, and the like of a text.

Obtaining the personalized data can be realized by steps S21 to S24.

In step S12, a pre-generated reference acoustic model is obtained. The reference acoustic model is generated according to large-scale samples.

The reference acoustic model can be generated using an ordinary way of training with the large-scale samples.

During model training, in order to solve a problem that a synthesis speech is unnatural caused by incoherent parameters existing in a commonly used training of decision tree model, a neural network is used for model training in this embodiment. For example, the neural network is a long-short term memory (LSTM for short) network structure or a bidirectional LSTM network structure. LSTM network structure is a time recursive neural network. Correspondingly, the generated acoustic model can be called as a neural network acoustic model.

Taking the neural network model training as an example, referring to FIG. 2, when generating the reference neural network acoustic model, it may include followings.

In step S25, large-scale speech data is obtained.

In step S26, large-scale text annotation data is obtained.

The large-scale speech data and the large-scale text annotation data correspond to each other, have a large scale, and have a well ability to cover phones and cover meter, to describe more phonetic phenomena.

In step S27, a feature extraction is performed on the large-scale speech data.

For example, features such as a spectrum, a fundamental frequency, duration, and the like are extracted.

In step S28, a neural network model training is performed according to extracted features and the large-scale text annotation data to generate the reference neural network acoustic model.

In step S13, an adaptive model training is performed according to the personalized data and the reference acoustic model to generate a personalized acoustic model.

Unlike generating model by directly training according to samples, in this embodiment, after the personalized data is obtained, the adaptive model training can be performed on a reference acoustic model according to the personalized data, so that a large sample size may no longer need.

For example, referring FIG. 2, an adaptive neural network model training can be used during the adaptive model training (S29), thus generating a personalized neural network acoustic model.

Based on the reference acoustic model, global modification can be performed on the model parameters to self-adapt speech features of a speaker corresponding to the reference acoustic parameters to personalized speech via an adaptive technology using the processed personalized speech data. Update of the neural network model is global update of parameters of the whole network. Therefore, the training of personalized acoustic model can be realized with less recording data, greatly reducing size requirement of the recording data from a size of thousands to a size of hundreds or even dozens. Further, linguistic phenomena covered by the reference acoustic model is also well reflected in the generated personalized acoustic model.

In this embodiment, by performing the adaptive model training according to the personalized data and the reference acoustic model, required amount of personalized data is reduced, thus reducing required time for sample collection, reducing a required period for model generation, realizing rapid model generation. Moreover, individual demands can be satisfied by obtaining the personalized data. In addition, by generating the reference acoustic model with large-scale samples, accuracy and reliability of the personalized acoustic model generated according to the reference acoustic model can be ensured. Further, by using the neural network model training in model training, consistency of model parameters can be improved, thus improving naturalness of the synthesis speech.

Figure 3:
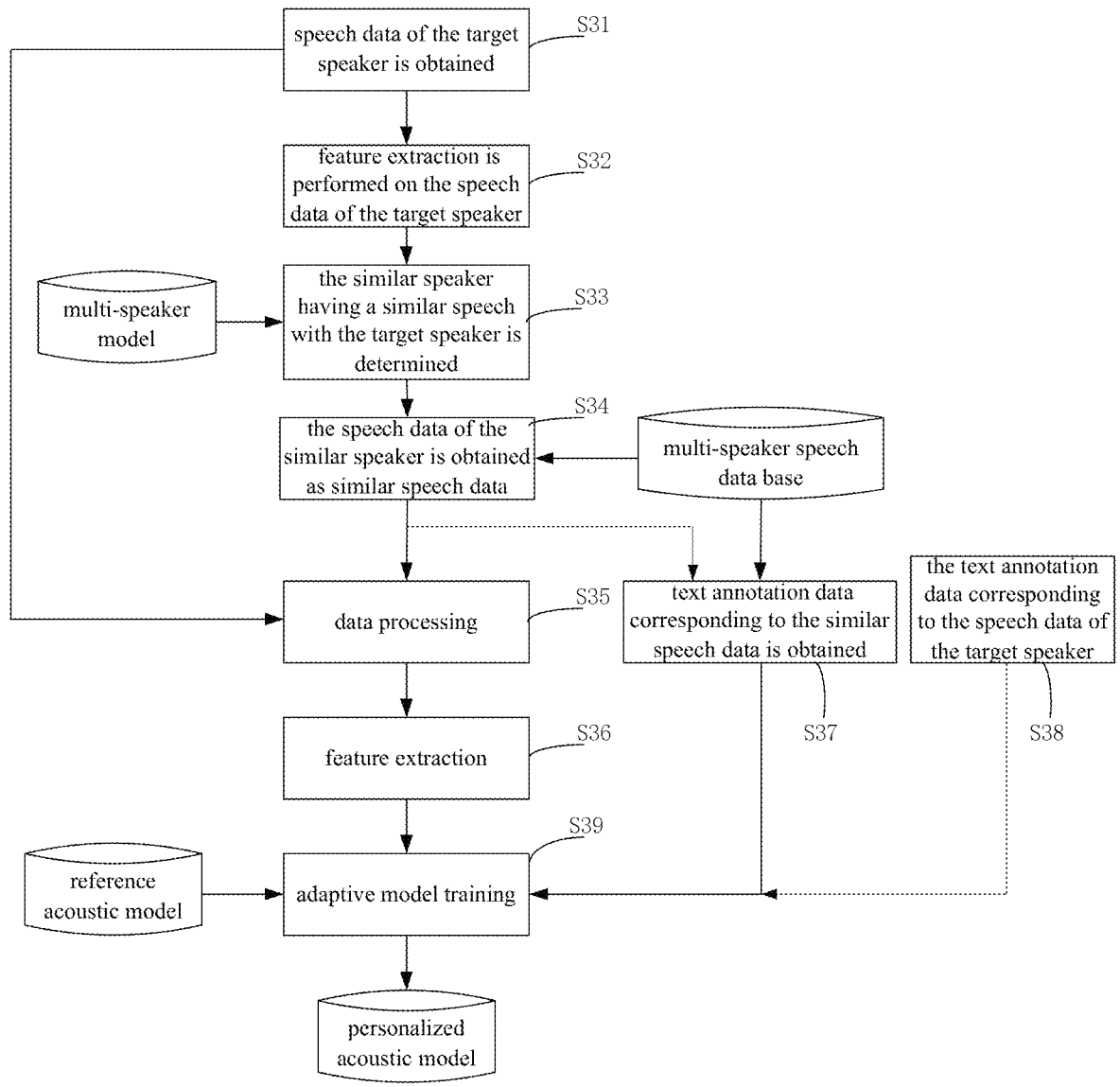
FIG. 3 is a flow chart of a method for generating an acoustic model according to yet another embodiment of the present disclosure.

FIG. 3 is a flow chart of a method for generating an acoustic model according to another embodiment of the present disclosure. The method includes the followings.

In step S31, speech data of the target speaker is obtained.

For example, the speech data of the target speaker includes speech data of a user himself, speech data of a family member or a friend of the user, speech data of a star, or the like.

In this embodiment, in order to reduce the collection number of samples of the speech data of the target speaker, speech data of a similar speaker having a similar speech with the target speaker is obtained to enrich the number of the samples.

Correspondingly, the method further includes determining the similar speaker having a similar speech with the target speaker.

Referring to FIG. 3, determining the similar speaker having a similar speech with the target speaker may include the followings.

In step S32, a feature extraction is performed on the speech data of the target speaker.

For example, features such as MFCC, PLP, thank, and the like are extracted.

In step S33, the similar speaker having a similar speech with the target speaker is determined according to extracted features of the target speaker and a pre-generated multi-speaker model.

The multi-speaker model is generated by performing a feature extraction on speech data taken as samples in advance and performing a model training according to extracted features.

For example, based on a pre-trained multi-speaker model, a similarity between the speech of the target speaker and that of a speaker in a data base is calculated using a speaker recognition technology, and one or more speakers who are very similar to the target speaker are picked out, for example, if the speech similarity is larger than a preset threshold, it is determined that the speaker in the data base is similar to the target speaker.

Figure 4:
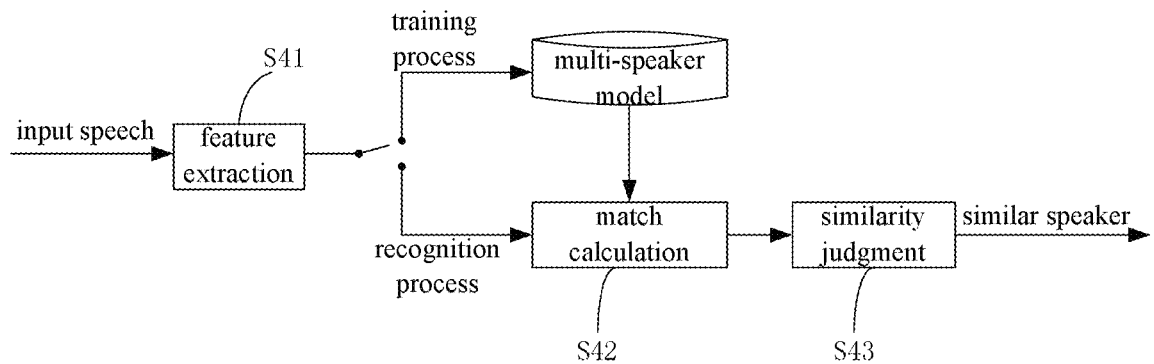
FIG. 4 is a schematic diagram of a training process and a recognizing process of a speaker model according to an embodiment of the present disclosure.

Regarding a process of training and recognition of the multi-speaker model, a reference can be made to FIG. 4. For example, the training process includes a feature extraction (S41) of samples. Then the multi-speaker model can be generated by training according to extracted features. In the recognition process, the feature extraction (S41) can be performed firstly on currently input speech data of the target speaker. Then a matched speaker is found in the multi-speaker model according to the extracted features (S42). And then, a similarity judgment (S43) is performed, for example, calculating whether a match value is larger than the threshold, so that the similar speaker is determined. Algorithms for training the multi-speaker model may include GMM-UBM, SVM, SVM-GMM, JFA, i-vector, and the like.

In step S34, the speech data of the similar speaker is obtained as similar speech data.

For example, speakers and speech data are stored in an association manner in a multi-speaker speech data base. Therefore, after the similar speaker is determined, the speech data of the similar speaker can be obtained from the multi-speaker speech data base according to an association relationship.

In step S35, data processing is performed on the speech data of the target speaker and the speech data of the similar speaker.

For example, the data processing includes de-noising processing, segmentation processing, and the like.

In step S36, a feature extraction is performed on the speech data after the data processing.

For example, extracted features include acoustic features such as a spectrum, a fundamental frequency, duration, and the like.

In step S37, text annotation data corresponding to the similar speech data is obtained from the preset pre-generated multi-speaker speech data base.

For example, speech data and text annotation data are stored in an association manner in the multi-speaker speech data base. Therefore, after the speech data of the similar speaker is obtained, corresponding text annotation data can be obtained according to an association relationship.

In step S38, the text annotation data corresponding to the speech data of the target speaker is obtained from the pre-generated multi-speaker speech data base or by a way of manual annotation or automatic annotation.

For example, if the text annotation data corresponding to the target speaker can be found in the multi-speaker speech data base, the text annotation data corresponding to the speech data of the target speaker is obtained from the multi-speaker speech data base. Alternatively, if the text annotation data corresponding to the target speaker cannot be found in the multi-speaker speech data base, the text annotation data corresponding to the speech data of the target speaker can be obtained by a way of manual annotation or automatic annotation. For example, the way of automatic annotation is realized in combination with technologies such as speech recognition, automatic boundary segmentation, and the like.

In some embodiments, if the text annotation data corresponding to the target speaker can be found in the multi-speaker speech data base, the method may include the followings after the manual annotation or the automatic annotation.

The speech data of the target speaker and the text annotation data corresponding to the speech data of the target speaker are stored in an association manner into the multi-speaker speech data base.

New personalized speech data can be added to the multi-speaker speech data base, to enrich contents of the data base continuously, and to renew speaker model continuously. The continuously renewed data base and speaker model can be used in subsequent processes of other personalized acoustic model training. It can be seen that, with the continuous generation of the personalized acoustic model, more and more speech data will be available, and the performance will be better and better. This continuously iterative and optimized approach will greatly improve expressiveness of the personalized acoustic model, meeting users' requirement, and enhancing their satisfaction.

In step S39, a pre-generated reference acoustic model is obtained, and an adaptive model training is performed on the reference acoustic model according to the extracted acoustic features, the text annotation data corresponding to the speech data of the target speaker, and the text annotation data corresponding to the speech data of the similar speaker, to generate a personalized acoustic model.

Regarding the process of generating the reference acoustic model, a reference can be made to FIG. 2, which is not described in detail herein.

After the personalized data is obtained, the adaptive model training can be performed on the reference acoustic model according to the personalized data, to generate the personalized acoustic model. The personalized data includes data obtained by performing the data processing and feature extraction on the speech data of the target speaker and the speech data of the similar speaker, the text annotation data corresponding to the speech data of the target speaker, and the text annotation data corresponding to the speech data of the similar speaker.

After the personalized speech data of the target speaker and speech data of other speakers similar to the target speaker are subjected to de-nosing, automatic segmentation, feature extraction, and the like, they and corresponding texts can be subjected to the adaptive model training on the basis of the pre-trained reference model. The so-called corresponding texts are annotation text corresponding to the speech data of the target speaker and annotation text corresponding to the speech data of other speakers similar to the target speaker. Thus a corresponding relationship between context information and acoustic parameters, i.e. the personalized acoustic model, is built. The acoustic model is adaptively generated based on the reference model covering rich linguistic phenomena, using the personalized speech of the target speaker and the speech similar to that of the target speaker, so that a problem that data of the target speaker is difficult to collect or is of difficulty in collection is solved, thus a personalized acoustic model very close to the target speaker can be trained only with a few words of the target speaker. Since the speech data very similar to that of the target speaker is added, effect of the adaptive training is more stable, and effect of generated speech is better when it is applied in a speech synthesis system.

In this embodiment, by analyzing features of a speaker, extracting speech data similar to that of the target speaker using a large-scale multi-speaker data base, and participating the adaptive model training together, required amount of target personalized speech data can be greatly reduced, at the same time it is ensured that the acoustic model can well reflect the features of the target personalized speech, thus achieving an objective of rapidly realizing a personalized speech synthesis system. With continuously enriching of the speaker data base, its effect will be improved continually, resulting in a very well expansibility.

After the personalized acoustic model is obtained, the personalized acoustic model can be used for speech synthesis, to synthesize a personalized speech.

Figure 5:
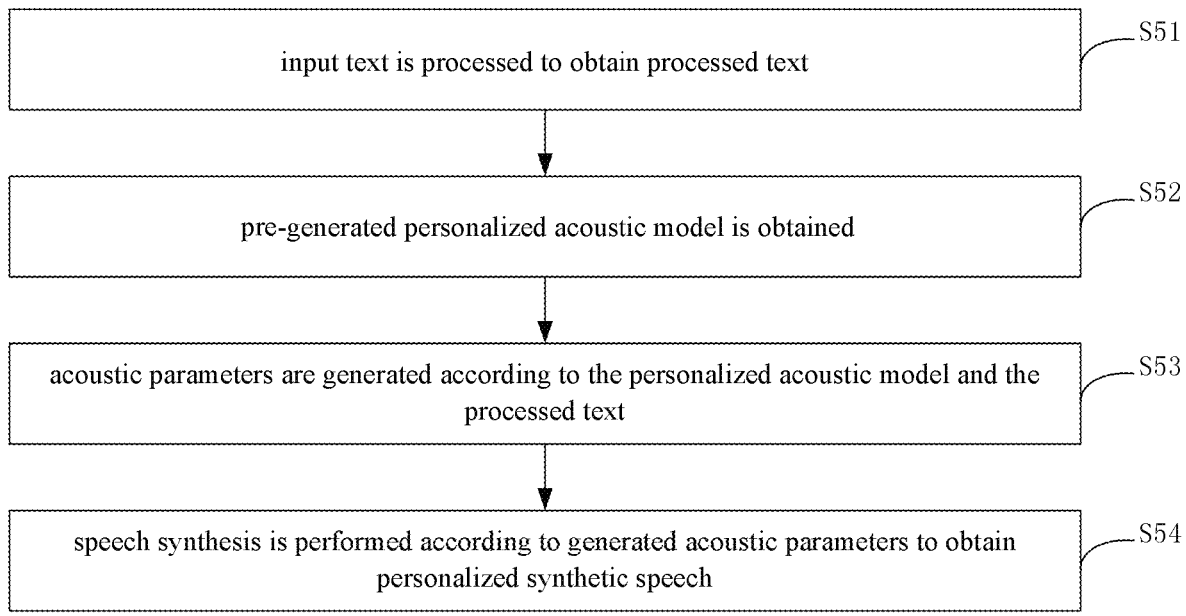
FIG. 5 is a flow chart of a method for speech synthesis according to an embodiment of the present disclosure.

FIG. 5 is a flow chart of a method for speech synthesis according to an embodiment of the present disclosure. The method includes the followings.

In step S51, input text is processed to obtain processed text.

Figure 6:
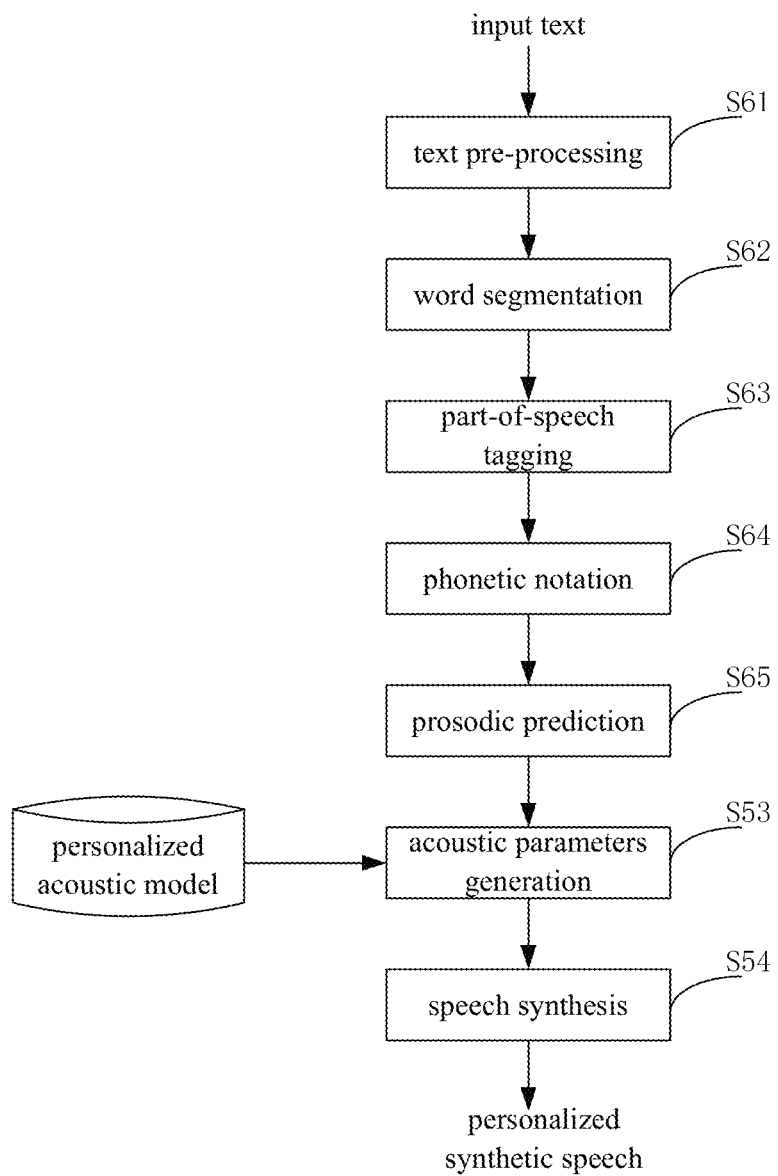
FIG. 6 is a flow chart of a method for speech synthesis according to another embodiment of the present disclosure.

For example, referring to FIG. 6, a processing process may include text pre-processing (S61), word segmentation (S62), part-of-speech tagging (S63), phonetic notation (S64), prosodic prediction (S65), and the like.

In step S52, a pre-generated personalized acoustic model is obtained.

The personalized acoustic model can be generated according to above embodiments, which is not described in detail herein.

In step S53, acoustic parameters are generated according to the personalized acoustic model and the processed text.

In step S54, speech synthesis is performed according to generated acoustic parameters to obtain personalized synthetic speech.

Principles of generation of the acoustic parameters and the speech synthesis can be based on existing approaches. What is different from the existing approaches is that, embodiments of the present disclosure use the personalized acoustic model to distinguish from a common acoustic model in the existing approaches.

In this embodiment, by using the personalized acoustic model, the personalized synthesis speech can be generated, such that individual demands of users are satisfied.

Figure 7:
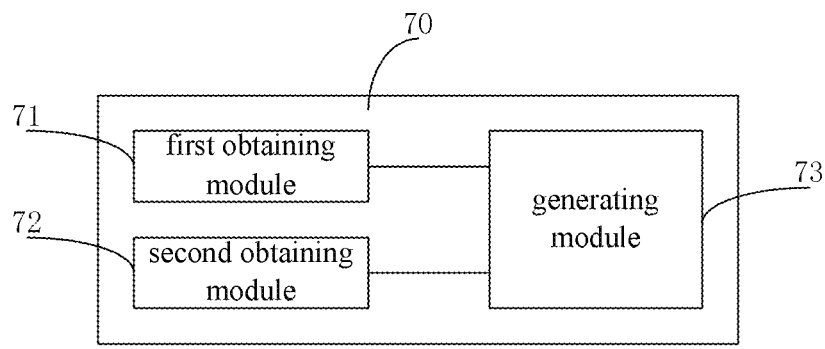
FIG. 7 is a block diagram of a device for generating an acoustic model according to an embodiment of the present disclosure.

FIG. 7 is a block diagram of a device for generating an acoustic model according to an embodiment of the present disclosure. The device 70 includes a first obtaining module 71, a second obtaining module 72, and a generating module 73.

The first obtaining module 71 is configured to obtain personalized data, in which the personalized data is obtained according to personalized speech data and corresponding personalized text data.

In some embodiments, the first obtaining module 71 is configured to: obtaining the personalized speech data, to perform data processing on the personalized speech data, and to perform a feature extraction on personalized speech data after the data processing; and to obtain personalized text annotation data corresponding to the personalized speech data. The personalized text annotation data is obtained by annotating personalized text data corresponding to the personalized speech data.

The personalized speech data is speech data that can meet individual demands of users.

The personalized speech data can only include speech data of a target speaker, or can include the speech data of the target speaker and speech data of a similar speaker having a similar speech with the target speaker For example, the speech data of the target speaker includes speech data of a user himself, speech data of a family member or a friend of the user, speech data of a star, or the like.

The personalized speech data can be obtained by sample collection.

Compared with thousands of samples usually collected during training of an ordinary acoustic model, when the personalized speech data is just the speech data of the target speaker, a sample size of the speech data of the target speaker is in a range of several hundreds or several dozens, and when the personalized speech data also includes the speech data of the similar speaker, the sample size of the speech data of the target speaker can be further reduced, for example, collecting several sentences.

For example, the data processing includes de-noising processing, segmentation processing, and the like. Specific de-noising rules and segmentation rules can be preset.

For example, extracted features include acoustic features such as a spectrum, a fundamental frequency, duration, and the like.

The personalized text annotation data is obtained by annotating personalized text corresponding to the personalized speech data. In detail, when the personalized speech data is collected, corresponding personalized text data is obtained at the same time. It is found whether there is annotation data corresponding to the personalized text data in an existing database. If yes, the annotation data corresponding to the personalized text data can be directly obtained from the existing database as the personalized text annotation data. If no, a way of manual annotation or automatic annotation can be used to obtain the personalized text annotation data. For example, the way of automatic annotation can be realized in combination with technologies such as speech recognition, automatic boundary segmentation, and the like.

For example, the text annotation data includes annotation to Chinese phoneticize, prosodic hierarchy, and the like of a text.

When the personalized speech data includes the speech data of a target speaker and the speech data of a similar speaker, the first obtaining module 71 is configured to obtain personalized speech data by: obtaining the speech data of the target speaker; determining the similar speaker having a similar speech with the target speaker; and obtaining the speech data of the similar speaker as similar speech data.

For example, the speech data of the target speaker includes speech data of a user himself, speech data of a family member or a friend of the user, speech data of a star, or the like.

In this embodiment, in order to reduce the collection number of samples of the speech data of the target speaker, the speech data of a similar speaker having a similar speech with the target speaker is obtained to enrich the number of the samples.

In some embodiments, the first obtaining module 71 is configured to determine the similar speaker having a similar speech with the target speaker by: performing a feature extraction on the speech data of the target speaker; and determining the similar speaker having a similar speech with the target speaker according to extracted features of the target speaker and a pre-generated multi-speaker model. The multi-speaker model is generated by performing a feature extraction on speech data taken as samples in advance and performing a model training according to extracted features.

For example, features such as MFCC, PLP, thank, and the like are extracted.

For example, based on a pre-trained multi-speaker model, a similarity between the speech of the target speaker and that of a speaker in a data base is calculated using a speaker recognition technology, and one or more speakers who are very similar to the target speaker are picked out, for example, if the speech similarity is larger than a preset threshold, it is determined that the speaker in the data base is similar to the target speaker.

Regarding a process of training and recognition of the multi-speaker model, a reference can be made to FIG. 4. For example, the training process includes a feature extraction (S41) of samples. Then the multi-speaker model can be generated by training according to extracted features. In the recognition process, the feature extraction (S41) can be performed firstly on currently input speech data of the target speaker. Then a matched speaker is found in the multi-speaker model according to the extracted features (S42). And then, a similarity judgment (S43) is performed, for example, calculating whether a match value is larger than the threshold, so that the similar speaker is determined. Algorithms for training the multi-speaker model may include GMM-UBM, SVM, SVM-GMM, JFA, i-vector, and the like.

For example, speakers and speech data are stored in an association manner in a multi-speaker speech data base. Therefore, after the similar speaker is determined, the speech data of the similar speaker can be obtained from the multi-speaker speech data base according to an association relationship.

The personalized text annotation data corresponding to the personalized speech data includes: text annotation data corresponding to the speech data of the target speaker and text annotation data corresponding to the similar speech data. The personalized text annotation data corresponding to the personalized speech data is obtained by: obtaining the text annotation data corresponding to the similar speech data from a pre-generated multi-speaker speech data base; and obtaining the text annotation data corresponding to the speech data of the target speaker from the pre-generated multi-speaker speech data base or by a way of manual annotation or automatic annotation. The way of automatic annotation is realized in combination with technologies such as speech recognition, automatic boundary segmentation, and the like.

For example, speech data and text annotation data are stored in an association manner in the multi-speaker speech data base. Therefore, after the speech data of the similar speaker is obtained, corresponding text annotation data can be obtained according to an association relationship.

For example, if the text annotation data corresponding to the target speaker can be found in the multi-speaker speech data base, the text annotation data corresponding to the speech data of the target speaker is obtained from the multi-speaker speech data base. Alternatively, if the text annotation data corresponding to the target speaker cannot be found in the multi-speaker speech data base, the text annotation data corresponding to the speech data of the target speaker can be obtained by a way of manual annotation or automatic annotation. For example, the way of automatic annotation is realized in combination with technologies such as speech recognition, automatic boundary segmentation, and the like.

Figure 8:
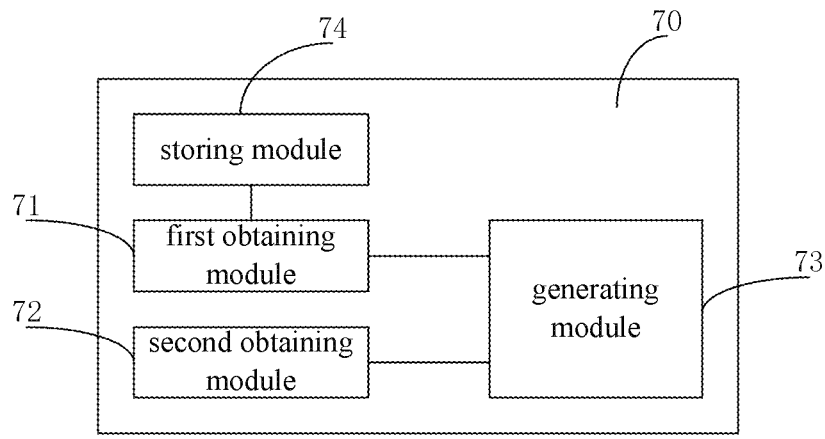
FIG. 8 is a block diagram of a device for generating an acoustic model according to another embodiment of the present disclosure.

In some embodiments, referring to FIG. 8, when the text annotation data corresponding to the speech data of the target speaker is obtained by the way of manual annotation or automatic annotation, the device further includes a storing module 74.

The storing module 74 is configured to store the speech data of the target speaker and the text annotation data corresponding to the speech data of the target speaker in an association manner into the multi-speaker speech data base.

New personalized speech data can be added to the multi-speaker speech data base, to enrich contents of the data base continuously, and to renew speaker model continuously. The continuously renewed data base and speaker model can be used in subsequent processes of other personalized acoustic model training. It can be seen that, with the continuous generation of the personalized acoustic model, more and more speech data will be available, and the performance will be better and better. This continuously iterative and optimized approach will greatly improve expressiveness of the personalized acoustic model, meeting users' requirement, and enhancing their satisfaction.

The second obtaining module 72 is configured to obtain a pre-generated reference acoustic model. The reference acoustic model is generated according to large-scale samples.

The reference acoustic model can be generated using an ordinary way of training with the large-scale samples.

During model training, in order to solve a problem that a synthesis speech is unnatural caused by incoherent parameters existing in a commonly used training of decision tree model, a neural network is used for model training in this embodiment. For example, the neural network is a long-short term memory (LSTM for short) network structure or a bidirectional LSTM network structure. LSTM network structure is a time recursive neural network. Correspondingly, the generated acoustic model can be called as a neural network acoustic model.

The neural network model training is taken as an example, regarding the process of generating the reference neural network acoustic model, a reference can be made to FIG. 2, which is not described in detail herein.

The generating module 73 is configured to perform an adaptive model training according to the personalized data and the reference acoustic model to generate a personalized acoustic model.

Unlike generating model by directly training according to samples, in this embodiment, after the personalized data is obtained, the adaptive model training can be performed on a reference acoustic model according to the personalized data, so that a large sample size may no longer need.

For example, referring FIG. 2, an adaptive neural network model training can be used during the adaptive model training (S29), thus generating a personalized neural network acoustic model.

Based on the reference acoustic model, global modification can be performed on the model parameters to self-adapt speech features of a speaker corresponding to the reference acoustic parameters to personalized speech via an adaptive technology using the processed personalized speech data. Update of the neural network model is global update of parameters of the whole network. Therefore, the training of personalized acoustic model can be realized with less recording data, greatly reducing size requirement of the recording data from a size of thousands to a size of hundreds or even dozens. Further, linguistic phenomena covered by the reference acoustic model is also well reflected in the generated personalized acoustic model.

In this embodiment, by performing the adaptive model training according to the personalized data and the reference acoustic model, required amount of personalized data is reduced, thus reducing required time for sample collection, reducing a required period for model generation, realizing rapid model generation. Moreover, individual demands can be satisfied by obtaining the personalized data. In addition, by generating the reference acoustic model with large-scale samples, accuracy and reliability of the personalized acoustic model generated according to the reference acoustic model can be ensured. Further, by using the neural network model training in model training, consistency of model parameters can be improved, thus improving naturalness of the synthesis speech.

Figure 9:
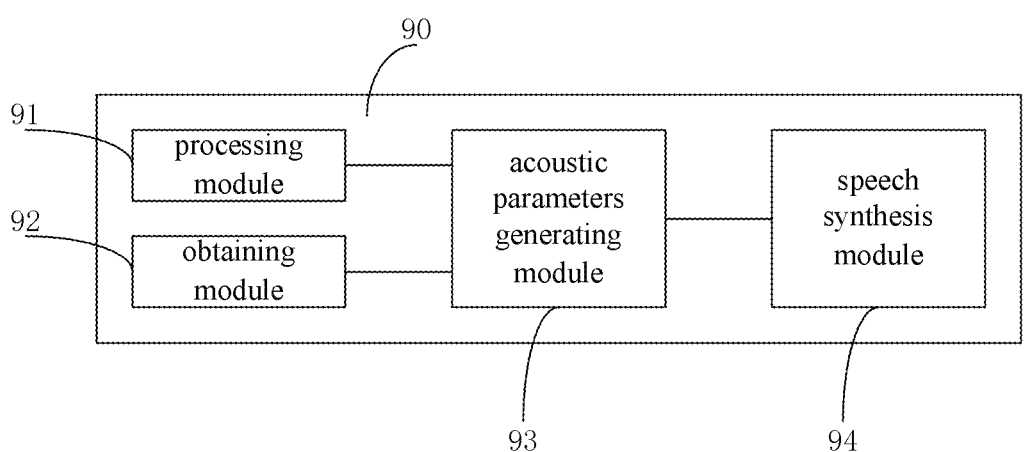
FIG. 9 is a block diagram of a device for speech synthesis according to an embodiment of the present disclosure.

FIG. 9 is a block diagram of a device for speech synthesis according to an embodiment of the present disclosure. The device includes a processing module 91, an obtaining module 92, a generating module 93, and a synthesis module 94.

The processing module 91 is configured to process input text to obtain processed text.

For example, referring to FIG. 6, a processing process may include text pre-processing (S61), word segmentation (S62), part-of-speech tagging (S63), phonetic notation (S64), prosodic prediction (S65), and the like.

The obtaining module 92 is configured to obtain a pre-generated personalized acoustic model.

The personalized acoustic model can be generated according to above embodiments, which is not described in detail herein.

The generating module 93 is configured to generate acoustic parameters according to the personalized acoustic model and the processed text.

The synthesis module 94 is configured to perform speech synthesis according to generated acoustic parameters to obtain personalized synthetic speech.

Principles of generation of the acoustic parameters and the speech synthesis can be based on existing approaches. What is different from the existing approaches is that, embodiments of the present disclosure use the personalized acoustic model to distinguish from a common acoustic model in the existing approaches.

In this embodiment, by using the personalized acoustic model, the personalized synthesis speech can be generated, such that individual demands of users are satisfied.

Embodiments of the present disclosure further provide an electronic apparatus, includes: one or more processors; a memory; one or more programs. The one or more programs stored in the memory, when executed by the one or more processors, personalized data is obtained, in which the personalized data is obtained according to personalized speech data and corresponding personalized text data; a pre-generated reference acoustic model is obtained, in which the reference acoustic model is generated according to large-scale samples; and an adaptive model training is performed according to the personalized data and the reference acoustic model to generate a personalized acoustic model.

Embodiments of the present disclosure further provide a non-transitory computer storage medium having one or more modules stored therein, when the one or more modules are executed, personalized data is obtained, in which the personalized data is obtained according to personalized speech data and corresponding personalized text data; a pre-generated reference acoustic model is obtained, in which the reference acoustic model is generated according to large-scale samples; and an adaptive model training is performed according to the personalized data and the reference acoustic model to generate a personalized acoustic model.

Embodiments of the present disclosure further provide an electronic apparatus, includes: one or more processors; a memory; one or more programs. The one or more programs stored in the memory, when executed by the one or more processors, input text is processed to obtain processed text; a pre-generated personalized acoustic model is obtained; acoustic parameters are generated according to the personalized acoustic model and the processed text; and speech synthesis is performed according to generated acoustic parameters to obtain personalized synthetic speech; in which the personalized acoustic model is generated using the following method including: obtaining personalized data, in which the personalized data is obtained according to personalized speech data and corresponding personalized text data; obtaining a pre-generated reference acoustic model, in which the reference acoustic model is generated according to large-scale samples; and performing an adaptive model training according to the personalized data and the reference acoustic model to generate a personalized acoustic model.

Embodiments of the present disclosure further provide a non-transitory computer storage medium having one or more modules stored therein, when the one or more modules are executed, input text is processed to obtain processed text; a pre-generated personalized acoustic model is obtained; acoustic parameters are generated according to the personalized acoustic model and the processed text; and speech synthesis is performed according to generated acoustic parameters to obtain personalized synthetic speech; in which the personalized acoustic model is generated using the following method including: obtaining personalized data, in which the personalized data is obtained according to personalized speech data and corresponding personalized text data; obtaining a pre-generated reference acoustic model, in which the reference acoustic model is generated according to large-scale samples; and performing an adaptive model training according to the personalized data and the reference acoustic model to generate a personalized acoustic model.

It should be noted that, terms such as "first" and "second" are used herein for purposes of description and are not intended to indicate or imply relative importance or significance. In addition, in the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "one embodiment," "some embodiments," "an example," "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for generating an acoustic model, comprising:

obtaining personalized data, wherein the personalized data is obtained according to personalized speech data and personalized text data corresponding to the personalized speech data;

obtaining a pre-generated reference acoustic model, wherein the pre-generated reference acoustic model is generated according to large-scale samples; and performing an adaptive model training according to the personalized data and the pre-generated reference acoustic model to generate a personalized acoustic model;

wherein obtaining personalized data comprises:
  obtaining the personalized speech data, performing data processing on the personalized speech data, and performing a feature extraction on personalized speech data after the data processing; and
  obtaining personalized text annotation data corresponding to the personalized speech data, wherein the personalized text annotation data is obtained by annotating personalized text data corresponding to the personalized speech data;

wherein when the personalized speech data comprises speech data of a target speaker and speech data of a similar speaker, obtaining personalized speech data comprises:
  obtaining the speech data of the target speaker;
  determining the similar speaker having a similar speech with the target speaker; and
  obtaining the speech data of the similar speaker as similar speech data;

wherein the personalized text annotation data corresponding to the personalized speech data comprises: text annotation data corresponding to the speech data of the target speaker and text annotation data corresponding to the similar speech data, and obtaining personalized text annotation data corresponding to the personalized speech data comprises:
  obtaining the text annotation data corresponding to the similar speech data from a pre-generated multi-speaker speech data base; and
  obtaining the text annotation data corresponding to the speech data of the target speaker from the pre-generated multi-speaker speech data base or by a way of manual annotation or automatic annotation.

2. The method according to claim 1, wherein determining the similar speaker having a similar speech with the target speaker comprises:
  performing a feature extraction on the speech data of the target speaker; and
  determining the similar speaker having a similar speech with the target speaker according to extracted features of the target speaker and a pre-generated multi-speaker model, wherein the pre-generated multi-speaker model is generated by performing a feature extraction on speech data configured as samples in advance and performing a model training according to extracted features.

3. The method according to claim 1, when the text annotation data corresponding to the speech data of the target speaker is obtained by the way of manual annotation or automatic annotation, further comprising:
  storing the speech data of the target speaker and the text annotation data corresponding to the speech data of the target speaker in an association manner into the pre-generated multi-speaker speech data base.

4. The method according to claim 1, wherein the reference acoustic model is a reference neural network model, the adaptive model training is an adaptive neural network model training, and the personalized acoustic model is a personalized neural network model.

5. The method according to claim 1, wherein the pre-generated reference acoustic model is generated by:
  obtaining large-scale speech data from the large-scale samples;
  obtaining large-scale text annotation data;
  performing a feature extraction on the large-scale speech data;
  performing a neural network model training according to extracted features and the large-scale text annotation data to generate reference neural network acoustic model as the pre-generated reference acoustic model.

6. The method according to claim 1, wherein data processing comprises at least one of de-noising processing and segmentation processing.

7. A method for speech synthesis, comprising:
  processing input text to obtain processed text;
  obtaining pre-generated personalized acoustic model;
  generating acoustic parameters according to the pre-generated personalized acoustic model and the processed text; and
  performing speech synthesis according to generated acoustic parameters to obtain personalized synthetic speech,
  wherein the pre-generated personalized acoustic model is generated using a method for generating an acoustic model, comprising:
    obtaining personalized data, wherein the personalized data is obtained according to personalized speech data and personalized text data corresponding to the personalized speech data;
    obtaining a pre-generated reference acoustic model, wherein the pre-generated reference acoustic model is generated according to large-scale samples; and
    performing an adaptive model training according to the personalized data and the pre-generated reference acoustic model to generate a personalized acoustic model;

wherein obtaining personalized data comprises:
    obtaining the personalized speech data, performing data processing on the personalized speech data, and performing a feature extraction on personalized speech data after the data processing; and
    obtaining personalized text annotation data corresponding to the personalized speech data, wherein the personalized text annotation data is obtained by annotating personalized text data corresponding to the personalized speech data;

wherein when the personalized speech data comprises speech data of a target speaker and speech data of a similar speaker, obtaining personalized speech data comprises:
    obtaining the speech data of the target speaker;
    determining the similar speaker having a similar speech with the target speaker; and
    obtaining the speech data of the similar speaker as similar speech data;

wherein the personalized text annotation data corresponding to the personalized speech data comprises: text annotation data corresponding to the speech data of the target speaker and text annotation data corresponding to the similar speech data, and obtaining personalized text annotation data corresponding to the personalized speech data comprises:
    obtaining the text annotation data corresponding to the similar speech data from a pre-generated multi-speaker speech data base; and obtaining the text annotation data corresponding to the speech data of the target speaker from the pre-generated multi-speaker speech data base or by a way of manual annotation or automatic annotation.

8. A device for generating an acoustic model, comprising:
a memory having computer programs executable by the processor; and
a processor;
wherein the processor is configured to:
  obtain personalized data, wherein the personalized data is obtained according to personalized speech data and personalized text data corresponding to the personalized speech data;
  obtain a pre-generated reference acoustic model, wherein the pre-generated reference acoustic model is generated according to large-scale samples; and
  perform an adaptive model training according to the personalized data and the pre-generated reference acoustic model to generate a personalized acoustic model;
wherein the processor is configured to obtain personalized data by obtaining the personalized speech data, performing data processing on the personalized speech data, and performing a feature extraction on personalized speech data after the data processing; and obtaining personalized text annotation data corresponding to the personalized speech data, wherein the personalized text annotation data is obtained by annotating personalized text data corresponding to the personalized speech data;
wherein when the personalized speech data comprises speech data of a target speaker and speech data of a similar speaker, the processor is configured to obtain personalized speech data by: obtaining the speech data of the target speaker; determining the similar speaker having a similar speech with the target speaker; and obtaining the speech data of the similar speaker as similar speech data;
wherein the personalized text annotation data corresponding to the personalized speech data comprises: text annotation data corresponding to the speech data of the target speaker and text annotation data corresponding to the similar speech data, and the processor is configured to obtain personalized text annotation data corresponding to the personalized speech data by:
  obtaining the text annotation data corresponding to the similar speech data from a pre-generated multi-speaker speech data base; and
  obtaining the text annotation data corresponding to the speech data of the target speaker from the pre-generated multi-speaker speech data base or by a way of manual annotation or automatic annotation.

9. The device according to claim 8, wherein the processor is configured to determine the similar speaker having a similar speech with the target speaker by:
  performing a feature extraction on the speech data of the target speaker; and
  determining the similar speaker having a similar speech with the target speaker according to extracted features of the target speaker and a pre-generated multi-speaker model, wherein the pre-generated multi-speaker model is generated by performing a feature extraction on speech data configured as samples in advance and performing a model training according to extracted features.

10. The device according to claim 8, when the text annotation data corresponding to the speech data of the target speaker is obtained by the way of manual annotation or automatic annotation, the processor is further configured to:
  store the speech data of the target speaker and the text annotation data corresponding to the speech data of the target speaker in an association manner into the pre-generated multi-speaker speech data base.

11. The device according to claim 8, wherein the reference acoustic model is a reference neural network model, the adaptive model training is an adaptive neural network model training, and the personalized acoustic model is a personalized neural network model.

* * * * *